United States Patent
Eo et al.

(10) Patent No.: US 10,100,903 B2
(45) Date of Patent: Oct. 16, 2018

(54) TRANSMISSION FOR VEHICLE

(71) Applicant: Hyundai Motor Company, Seoul (KR)

(72) Inventors: Soon Ki Eo, Ansan-si (KR); Ki Jong Park, Osan-si (KR); Chon Ok Kim, Yongin-si (KR)

(73) Assignee: Hyundai Motor Company, Seoul (KR)

( * ) Notice: Subject to any disclaimer, the term of this patent is extended or adjusted under 35 U.S.C. 154(b) by 352 days.

(21) Appl. No.: 14/937,578

(22) Filed: Nov. 10, 2015

(65) Prior Publication Data
US 2017/0002898 A1 Jan. 5, 2017

(30) Foreign Application Priority Data

Jul. 1, 2015 (KR) .................. 10-2015-0094083

(51) Int. Cl.
| | |
|---|---|
| *F16H 3/08* | (2006.01) |
| *F16H 3/00* | (2006.01) |
| *F16H 3/097* | (2006.01) |
| *F16H 3/10* | (2006.01) |

(52) U.S. Cl.
CPC ............. *F16H 3/006* (2013.01); *F16H 3/097* (2013.01); *F16H 3/10* (2013.01); *F16H 2003/007* (2013.01)

(58) Field of Classification Search
USPC .................................. 74/330, 331, 333, 340
See application file for complete search history.

(56) References Cited

U.S. PATENT DOCUMENTS

| | | | |
|---|---|---|---|
| 6,880,418 B2 | 4/2005 | Janson et al. | |
| 8,146,451 B2 | 4/2012 | Van Druten | |
| 8,156,836 B2 | 4/2012 | Remmler | |
| 8,360,919 B2 | 1/2013 | Kraynev | |
| 8,887,589 B2 * | 11/2014 | Ibamoto | F16H 3/08 74/330 |
| 8,915,159 B2 * | 12/2014 | Pregnolato | F16H 63/3416 74/330 |
| 8,919,216 B2 * | 12/2014 | Hunold | F16D 21/04 74/330 |

(Continued)

FOREIGN PATENT DOCUMENTS

| | | |
|---|---|---|
| JP | 2013-19424 A | 1/2013 |
| JP | 2013-119280 A | 6/2013 |

(Continued)

*Primary Examiner* — Ha Dinh Ho
(74) *Attorney, Agent, or Firm* — Morgan, Lewis & Bockius LLP

(57) ABSTRACT

A transmission may include a first input shaft continuously receiving torque from a power source; a second input shaft selectively receiving torque from the power source through a clutch; a first countershaft and a second countershaft connected with the first input shaft and the second input shaft, respectively, by a transfer gear pair; coupling devices transmitting torque to the first countershaft and the second countershaft from the first input shaft and the second input shaft by selecting the transfer gear pairs; a one-way clutch disposed on the first countershaft to allow torque provided to the first input shaft to be transmitted only to the first countershaft from the first input shaft; and a shifting mechanism including a plurality of shift gear pairs having different gear ratios on the first countershaft, the second countershaft, and the output shaft.

9 Claims, 10 Drawing Sheets

(56) References Cited

U.S. PATENT DOCUMENTS

| 9,670,991 | B2 | 6/2017 | Eo |
| 2005/0204841 | A1 | 9/2005 | Baldwin et al. |
| 2005/0204842 | A1 | 9/2005 | Baldwin |
| 2015/0039170 | A1 | 2/2015 | Isomura et al. |

FOREIGN PATENT DOCUMENTS

| JP | 2013-119882 A | 6/2013 |
| KR | 10-2009-0126700 A | 12/2009 |
| KR | 10-2009-0132758 A | 12/2009 |

* cited by examiner

TRANSMISSION FOR VEHICLE

CROSS REFERENCE TO RELATED APPLICATION

The present application claims priority to Korean Patent Application No. 10-2015-0094083, filed Jul. 1, 2015, the entire contents of which is incorporated herein for all purposes by this reference.

BACKGROUND OF THE INVENTION

Field of the Invention

The present invention relates to a transmission for a vehicle, and more particularly, to a transmission for a vehicle that reduces deterioration of shifting ability, including a backward pulling effect.

Description of Related Art

An automated manual transmission can provide convenience for a driver, similar to an automatic transmission, by providing an automatic shifting by means of an actuator while a vehicle is driven and can contribute to improving fuel efficiency of a vehicle while maintaining power transmission efficiency higher than an automatic transmission.

However, for an automated manual transmission based on a synchro-mesh type shifting mechanism, there is necessary a period where power from an engine is disconnected while automatic shifting is performed by an actuator that shifts gears, so torque is decreased and the shifting ability is deteriorated resulting in, for example, a backward pulling effect of the vehicle when shifting.

In order to solve these problems, a technology of selectively transmitting power from an engine to an output shaft by selecting a power transmission path from the engine, depending on the driving states of a vehicle, by providing a planetary gear set between the engine and a synchro-mesh type shifting mechanism has been proposed.

Further, a related art as another example, "Power train for a hybrid electric vehicle with automated manual transmission" has been proposed.

However, this technology requires two monitors to reduce deterioration of shifting ability, so the manufacturing cost and weight of a transmission increase.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY

Various aspects of the present invention are directed to providing a transmission for a vehicle that reduces deterioration of shifting ability, including a backward pulling effect when shifting.

In an aspect of the present invention, there is provided a transmission for a vehicle that includes: a first input shaft continuously receiving torque from a power source; a second input shaft selectively receiving torque from the power source through a clutch; a first countershaft and a second countershaft connected with the first input shaft and the second input shaft, respectively, by a transfer gear pair; coupling devices transmitting torque to the first countershaft and the second countershaft from the first input shaft and the second input shaft by selecting the transfer gear pairs; a one-way clutch disposed on the first countershaft to allow torque provided to the first input shaft to be transmitted only to the first countershaft from the first input shaft; and a shifting mechanism including a plurality of shift gear pairs having different gear ratios on the first countershaft, the second countershaft, and the output shaft, and changing and outputting power from the power source to the output shaft by selecting a shift gear pair corresponding to a speed of the vehicle, using a synchronizer.

The one-way clutch may be disposed in a power transmission path from an output transfer gear of the transfer gear pair on the first countershaft.

The one-way clutch may be disposed between the first countershaft and the coupling device selectively coupling an output transfer gear of the transfer gear pairs to the first countershaft.

The transfer gear pairs may include: a first transfer gear pair composed of a first input transfer gear on the first input shaft and a first output transfer gear on the first countershaft; and a second transfer gear pair composed of a second input transfer gear on the second input shaft and a second output transfer gear on the second countershaft, and the coupling devices may include: a first transfer coupling device selectively coupling the first transfer gear pair; and a second transfer coupling device selectively coupling the second transfer gear pair.

The first transfer coupling device may be disposed on the first countershaft and engaged with the first output transfer gear, and the second transfer coupling device may be disposed on the second countershaft and engaged with the second output transfer gear.

The shift gear pairs may include: a plurality of sub-shift gear pairs having different gear ratios and disposed on the first countershaft and the output shaft; and a plurality of main-shift gear pairs having different gear ratios and disposed on the second countershaft and the output shaft, and the sub-shift gear pairs and the main-shift gear pairs may be configured such that shift gear pairs having the same gear ratios exist.

The shift gear pairs may include: a plurality of sub-shift gear pairs having different gear ratios and disposed on the first countershaft and the output shaft; and a plurality of main-shift gear pairs having different gear ratios and disposed on the second countershaft and the output shaft, and the gear pairs may be configured such that a same resultant gear ratio exists between resultant gear ratios of a gear ratio of the first transfer gear pair and gear ratios of the sub-shift gear pairs and resultant gear ratios of a gear ratio of the second transfer gear pair and the main-shift gear pairs.

The shift gear pairs having the same gear ratios may have gear ratios over a specific gear ratio.

The sub-shift gear pairs and the main-shift gear pairs may share output gears on the output shaft.

Torque transmitted to an output shaft from an engine in a specific range is smoothly changed by slip control of a clutch and relative rotation action allowed by a one-way clutch in a process of shifting to a desired range, so deterioration of shifting ability, including a backward pulling effect of a vehicle when shifting, is prevented.

The methods and apparatuses of the present invention have other features and advantages which will be apparent from or are set forth in more detail in the accompanying drawings, which are incorporated herein, and the following Detailed Description, which together serve to explain certain principles of the present invention.

Figure 1:
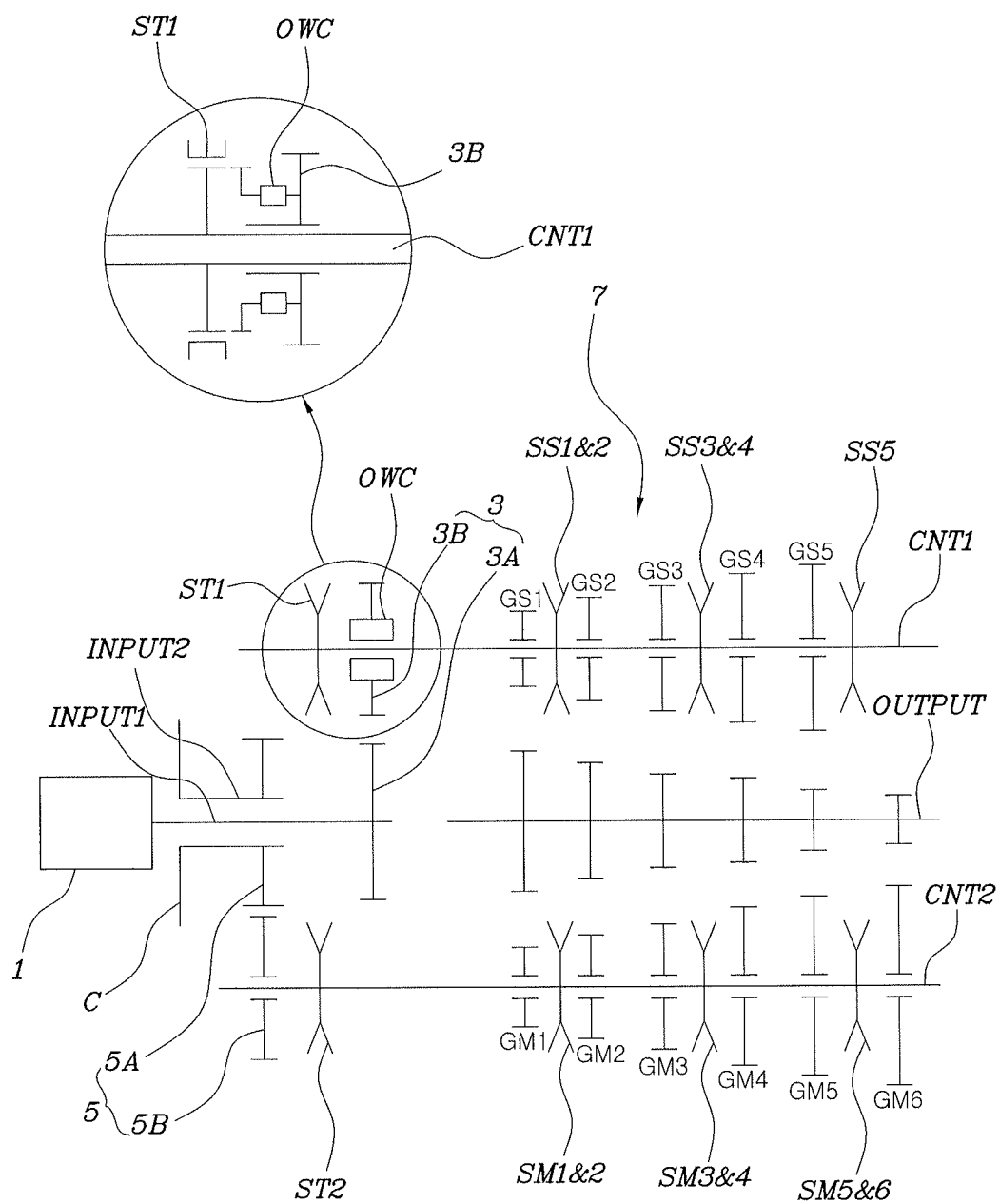
FIG. 1 is a diagram schematically showing the entire structure of a transmission for a vehicle according to an embodiment of the present invention.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that the present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

Exemplary embodiments of the present invention will be described hereafter in detail with reference to the accompanying drawings.

A transmission for a vehicle according to an embodiment of the present invention may include a first input shaft INPUT1, a second input shaft INPUT2, a first countershaft CNT1, a second countershaft CNT2, coupling, coupling devices, a one-way clutch OWC, and a shifting mechanism 7.

Referring to FIG. 1, in detail, the first input shaft INPUT1 is connected to a power source at a first end and can rotate by continuously receiving torque from the power source. The power source may be an engine 1 and the first input shaft INPUT1 can continuously be rotated by torque from the engine 1.

The second input shaft INPUT2 is connected to the power source through a clutch C at a first end and can rotate by selectively receiving torque from the power source in accordance with engagement and disengagement of the clutch C.

The first input shaft INPUT1 and the second input shaft INPUT2 may be coaxially arranged, in which the second input shaft INPUT2 may be a hollow shaft and the first input shaft INUPT1 may be inserted in the second input shaft INPUT2.

The first countershaft CNT1 may be connected with the first input shaft INPUT1 by a transfer gear pair.

For example, a first transfer gear pair 3 may be engaged with each other on the first input shaft INPUT1 and the first countershaft CNT1, respectively, and may include a pair of a first input transfer gear 3A on the first input shaft INPUT1 and a first output transfer gear 3B on the first countershaft CNT1.

The first input transfer gear 3A cannot rotate relative to the first input shaft INPUT1 and the first output transfer gear 3B may rotate relative to the first countershaft CNT1 or may be rotated relative to the first countershaft CNT1 by the one-way clutch OWC, which will be described below.

The second countershaft CNT2 may be connected with the second input shaft INPUT2 by a transfer gear pair.

For example, a second transfer gear pair 5 may be engaged with each other on the second input shaft INPUT2 and the second countershaft CNT2, respectively, and may include a pair of a second input transfer gear 5A on the second input shaft INPUT2 and a second output transfer gear 5B on the second countershaft CNT2.

The second input transfer gear 5A can rotate relative to the second input shaft INPUT2 and the second output transfer gear 5B can rotate relative to the second countershaft CNT2.

The coupling device can transmit torque from the first input shaft INPUT1 to the first countershaft CNT1 and from the second input shaft INPUT1 to the second countershaft CNT2 by selecting the transfer gear pairs.

For example, the coupling device may include a first transfer coupling device ST1 selectively coupling the first transfer gear pair 3 and a second transfer coupling device ST2 selectively coupling the second transfer gear pair 5.

That is, in shifting, by coupling the transfer gear pairs to corresponding countershafts using the transfer coupling devices in advance or after synchronization, torque from the power source can be transmitted from a shift gear pair making the current range to a shift gear pair for making a desire range.

To this end, the first transfer coupling device ST1 may be disposed on the first countershaft CNT1 and engaged with the first output transfer gear 3B. Further, the second transfer coupling device ST2 may be disposed on the second countershaft CNT2 and engaged with the second output transfer gear 5B.

The first transfer coupling device ST1 may be disposed at a first side or a second side of the first output transfer gear 3B and the second transfer coupling device ST2 may also be disposed at a first side or a second side of the second output transfer gear 5B.

For example, the first transfer coupling device ST1 may be disposed at a first side facing the engine 1 from the first output transfer gear 3B or at a second side facing the shifting mechanism 7 from the first output transfer gear 3B.

Further, the second transfer coupling device ST2 may be disposed at the second side facing the shifting mechanism 7 from the second output transfer gear 5B or at the first side facing the engine 1 from the second output transfer gear 5B.

All types of coupling devices for connecting/disconnecting power, including a synchro-mesh type synchronizer, a dog clutch, a modified dog clutch, a wet/dry clutch, an electric/electronic wet/dry magnet clutch, a coupling, a fluid coupling, and a spline, may be used as the first transfer coupling device ST1 and the second transfer coupling device ST2.

The one-way clutch OWC is disposed on the first countershaft CNT1 and may allow torque from the first input shaft INPUT1 to be transmitted only to the first countershaft CNT1 from the first input shaft INPUT1 and may prevent torque to be transmitted to the first input shaft INPUT1 from the first countershaft CNT1.

For example, referring to FIG. 1, the one-way clutch OWC may be disposed in a power transmission path from the output transfer gear of the transfer gear pair on the first countershaft CNT1.

For example, in a range gear (not given a reference numeral) that is the first output transfer gear 3B of the first transfer gear pair 3 and a shift gear (not given a reference numeral), the one-way clutch OWC may be disposed at the middle of the range gear or between the range gear and the shift gear.

Figure 4:
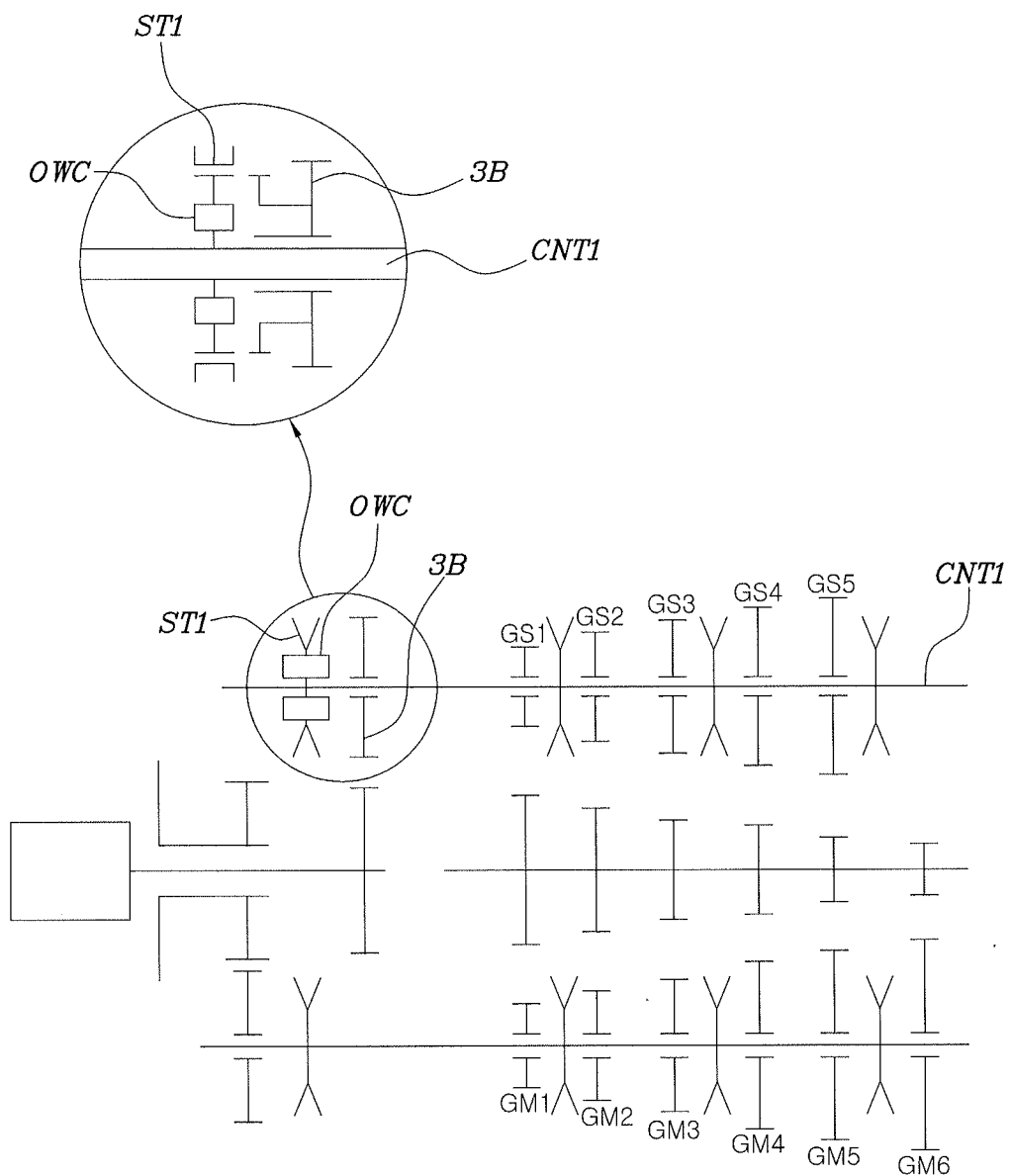
FIG. 4 is a diagram illustrating the entire configuration of a transmission for a vehicle having another arrangement of a one-way clutch according to an embodiment of the present invention.

As another example, referring to FIG. 4, the one-way clutch OWC may be disposed between the first countershaft CNT1 and the coupling device that selectively couples the output transfer gear of the transfer gear pair to the first countershaft CNT1.

For example, the one-way clutch OWC may be disposed between the first countershaft CNT1 and the first transfer coupling device ST1 coupling the first output transfer gear 3B to the first countershaft CNT1.

That is, when the rotation speed of the first output transfer gear 3B is larger than the rotation speed of the first countershaft CNT1, the first output transfer gear 3B forcibly rotates the first countershaft CNT1, but when the rotation speed of the first countershaft CNT1 is larger than the rotation speed of the first output transfer gear 3B, relative rotation of the first output transfer gear 3B is allowed by the one-way clutch OWC, so the difference in rotation speed between the first countershaft CNT1 and the first output transfer gear 3B can be absorbed.

The one-way clutch OWC may be used as a member mechanically connecting or disconnecting power, but a mechanical device operating in the same principle, a hydraulic part or a hydraulic-mechanical composite device, or a device using electric/electromagnetic force may be used.

Next, referring to FIG. 1, the shifting mechanism 7 may include a plurality of shift gear pairs having different gear ratios on the first countershaft CNT1 and the output shaft OUTPUT, and the second countershaft CNT2 and the output shaft OUTPUT, and may change and output power from the power source, that is, the engine 1 to the output shaft OUTPUT by selecting a shift gear pair corresponding to the speed of a vehicle using a synchronizer.

The output shaft OUTPUT, which is disposed in parallel with the first countershaft CNT1 and the second countershaft CNT2, may be arranged coaxially with the first input shaft INPUT1 and the second input shaft INPUT2. Further, though not shown in the figures, output transmitted to the output shaft OUTPUT may be increased or decreased in speed through another pair of gears, a planetary gear set, or other transmission elements and then transmitted to wheels.

Shift gear pairs of the shifting mechanism 7 may include sub-shift gear pairs and main-shift gear pairs. The sub-shift gear pairs may provide different gear ratios to the first countershaft CNT1 and the output shaft OUTPUT and the main-shift gear pairs may provide different gear ratios to the second countershaft CNT2 and the output shaft OUTPUT.

For example, the sub-shift gear pairs and the main-shift gear pairs may include shift gear pairs having the same gear ratio.

The shift gear pairs having the same gear ratio may have gear ratios over a specific gear ratio. As shown in FIG. 1, in the shift gear pairs, the gear ratios of the 1-range to the 5-rage sub-shift gear pairs GS1, GS2, GS3, GS4, and GS5 and the gear ratios of the 1-range range to the 5-range main-shift gear pairs GM1, GM2, GM3, GM4, and GM5 may be made the same.

That is, torque assist is more needed when shifting is performed with a vehicle running at a relative low speed, so the sub-shift gear pairs and the main-shift gear pairs for lower ranges may be given the same gear ratios. Accordingly, it is possible to determine which ranges torque assist is applied to in shifting on the basis of the ranges of the sub-shift gear pairs.

For example, in a 6-range transmission, when six ranges are made by main-shift gear pairs and five ranges are made by sub-shift gear pairs, as shown in FIG. 1, torque assist can be achieved at all the ranges.

However, though not shown in the figures, when six ranges are made by main-shift gear pairs and four ranges are made by sub-shift gear pairs, torque assist can be achieved in shifting only from the 1-range to the 5-range.

Further, when six ranges are made by main-shift gear pairs and two ranges are made by sub-shift gear pairs, torque assist can be achieved in shifting only from the 1-range to the 3-range.

Further, in the present invention, the sub-shift gear pairs and the main-shift gear pairs may share the output gears on the output shaft OUTPUT.

For example, the 1-range, 2-range, 3-range, 4-range, and 5-range sub-shift gear pairs GS1, GS2, GS3, GS4, and GS5 may be engaged with each other on the first countershaft CNT1 and the output shaft OUTPUT, and the 1-range, 2-range, 3-range, 4-range, 5-range, and 6-range main-shift gear pairs GM1, GM2, GM3, GM4, GM5, and GM6 may be engaged with each other on the second countershaft CNT2 and the output shaft OUTPUT. 1-range to 5-range sub-shift input gears on the first countershaft CNT1 and 1-range to 5-range main-shift input gears on the second countershaft CNT2 may form the sub-shift gear pairs GS1, GS2, GS3, GS4, and GS5 and the main-shift gear pairs GM1, GM2, GM3, GM4, and GM5 by sharing the output gears on the output shaft OUTPUT.

Synchronizers for selecting the sub-shift gear pairs and the main-shift gear pairs may be disposed on the first countershaft CNT1 and the second countershaft CNT2, respectively.

For example, a sub-shift 1&2-range synchronizer SS1&2 may be disposed between sub-shift 1-range and 2-range input gears for sub-shifting, a sub-shift 3&4-range synchronizer SS3&4 may be disposed between sub-shift 3-range and 4-range input gears, and a sub-shift 5-range synchronizer SS5 may be disposed at a side of the sub-shift 5-range input gear.

Further, a main-shift 1&2-range synchronizer SM1&2 may be disposed between main-shift 1-range and 2-range input gears for main-shifting, a main-shift 3&4-range synchronizer SM3&4 may be disposed between main-shift 3-range and 4-range input gears, and a main-shift 5&6-range synchronizer SM5&6 may be disposed between main-shift 5-range and 6-range input gears.

In the present invention, the gear ratios of the sub-shift gear pairs and the main-shift gear pairs may be the same, but the gear ratios of the sub-shift gear pairs and the main-shift gear pairs may be different and the resultant gear ratio transmitted to the output shaft OUTPUT from the sub-shift gear pairs and the resultant gear ratio transmitted to the output shaft OUTPUT from the main-shift gear pairs may be the same.

For example, the gear pairs may be configured such that the same resultant gear ratio exists between the resultant gear ratios of the gear ratio of the first transfer gear pair 3 and the gear ratios of the sub-shift gear pairs and the resultant gear ratio of the gear ratio of the second transfer gear pair 5 and the gear ratios of the main-shift gear pairs.

That is, the shift gear pairs may be configured such that the resultant gear ratio obtained by multiplying the gear ratio of the first transfer gear pair 3 by the gear ratio of any one of the sub-shift gear pairs and the resultant gear ratio obtained by multiplying the gear ratio of the second transfer gear pair 5 by the gear ratio of any one of the main-shift gear pairs are the same.

The operation and effect of the present invention are described hereafter.

A process of shifting from the N-range (neutral) to the 1-range for a low speed is described with reference to FIGS. 2A to 2D.

The first input shaft INPUT1 is directly connected to the engine 1 when the vehicle is started, so the first input transfer gear pair 3 is rotated with the first input shaft INPUT1.

In this state, all the coupling devices in the transmission are positioned for the neutral state, so load is not applied to the operation of the engine 1 regardless of whether the clutch C is engaged or not.

Figure 2A:
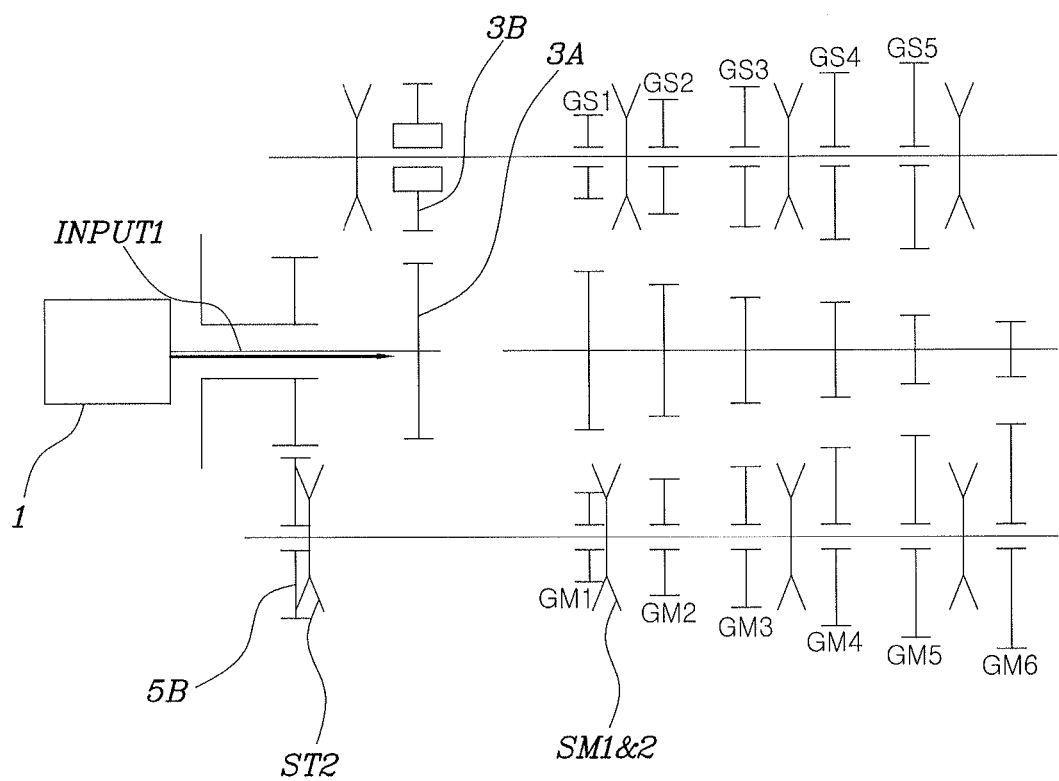
FIGS. 2A to 2D are diagrams illustrating a process of shifting from an N-range to a 1-range by a transmission for a vehicle of the present invention.

When shifting to the 1-range is started, as shown in FIG. 2A, before the clutch C is engaged, the second output transfer gear 5B of the second transfer gear pair 5 is coupled to the second countershaft CNT2 by the second transfer coupling device ST2 and the main-shift 1-range input gear is coupled to the second countershaft CNT2 by the main-shift 1&2 synchronizer SM1&2.

Figure 2B:
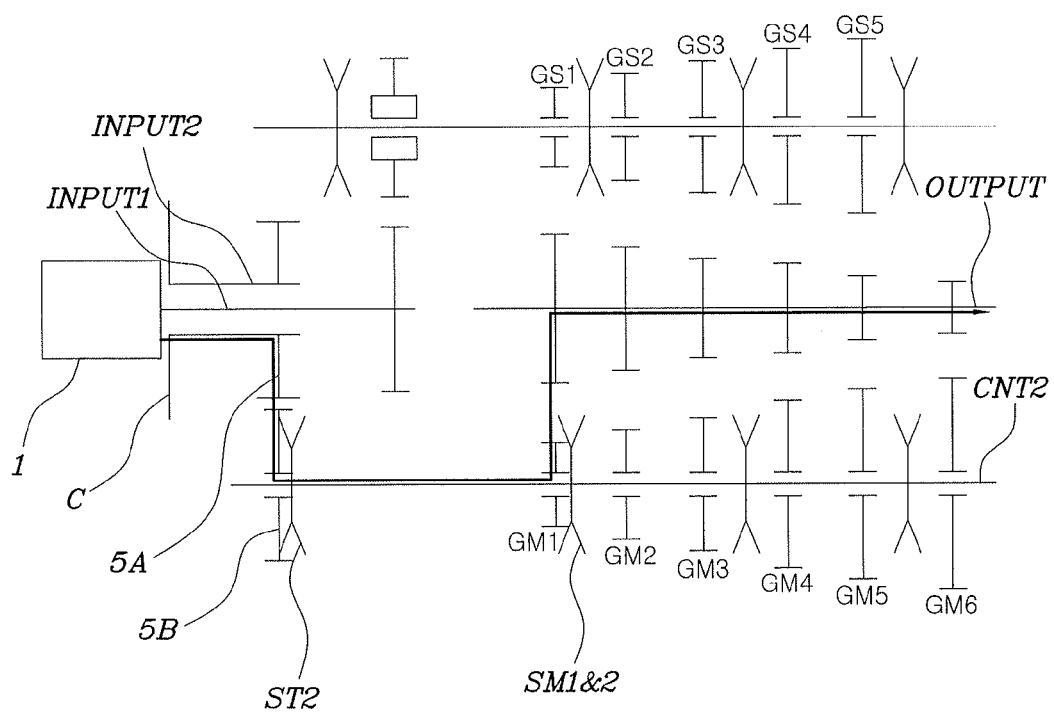

In this state, as the clutch C is slowly engaged, as in FIG. 2B, the torque from the engine 1 starts to be transmitted through the second input shaft INPUT2, so power is transmitted to the second countershaft CNT2 through the second transfer gear pair 5 and the vehicle can run in the 1-range by the main-shift 1-range shift gear pair GM1.

Figure 2C:
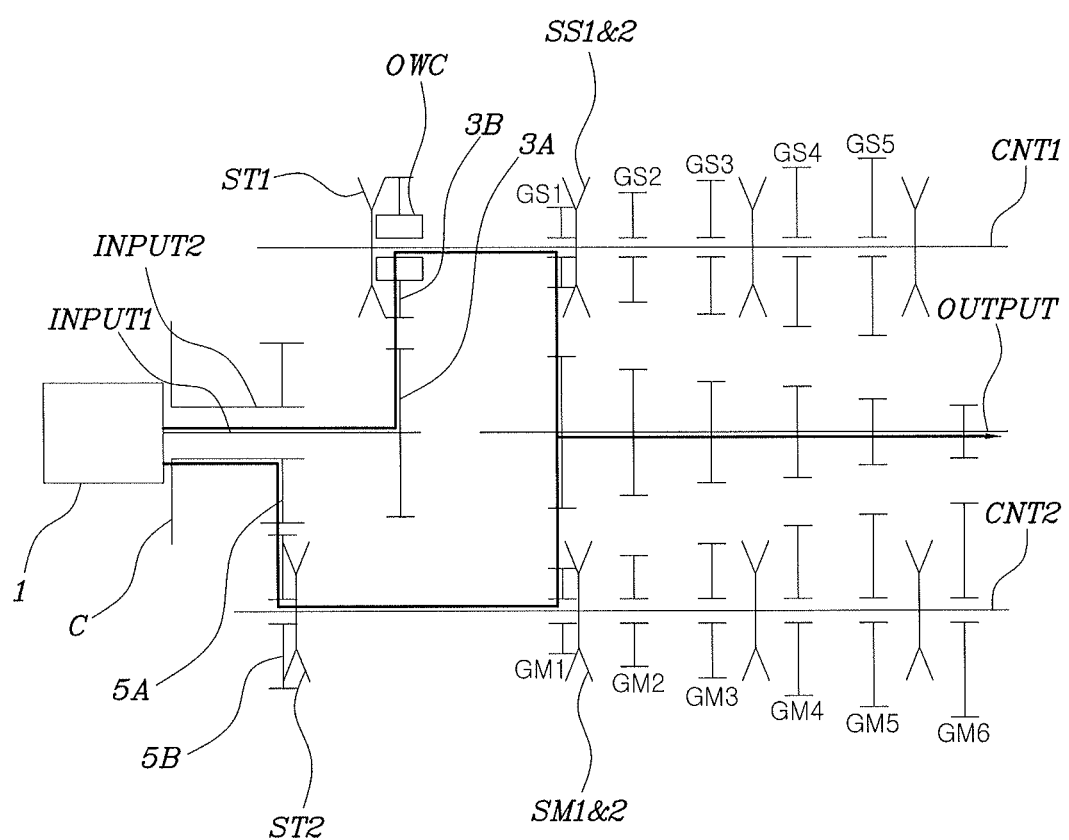

Thereafter, as in FIG. 2C, the first output transfer gear 3B of the first transfer gear pair 3 is coupled to the first countershaft CNT1 by the first transfer coupling device ST1 and the sub-shift 1-range input gear is coupled to the first countershaft CNT1 by the sub-shift 1&2 synchronizer SS1&2.

That is, when a vehicle runs in the 1-range, as in FIG. 2B, the first input shaft INPUT1 and the second input shaft INPUT2 rotate at the same rotation speed, in which the first transfer gear pair 3 and the second transfer gear pair 5 make the same gear ratio and the main-shift 1-range shift gear pair GM1 and the sub-shift 1-range shift gear pair GS1 also make the same gear ratio.

Accordingly, not only the first transfer gear pair 3 and the second transfer gear pair 5, but the main-shift 1-range shift gear pair GM1 and the sub-shift 1-range shift gear pair GS1 are rotated with their rotation speed synchronized, so the corresponding coupling device or synchronizer can be safely coupled without coupling noise or damage of the first transfer gear pair 3 and the sub-shift 1-range shift gear pair GS1.

Figure 2D:
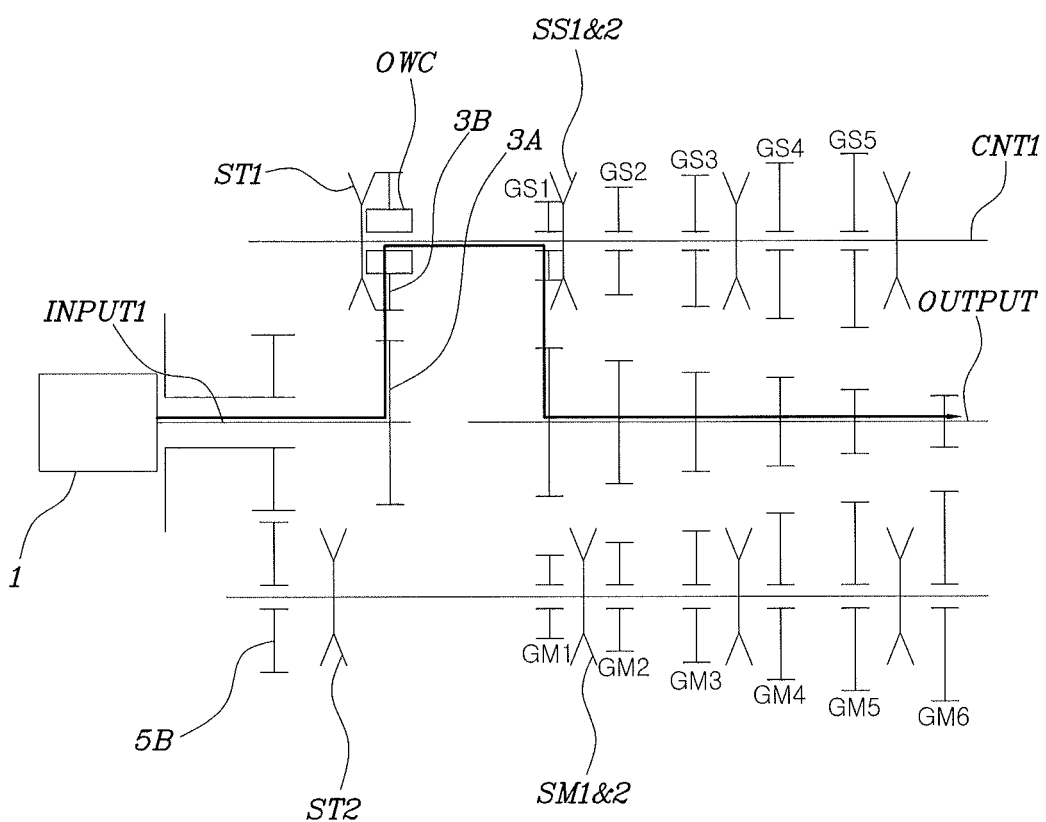

Next, as in FIG. 2D, the second transfer coupling device ST2 is decoupled from the second transfer gear pair 5 and the main-shift 1&2 synchronizer SM1&2 is decoupled from the main-shift 1-range shift gear pair GM1. However, the first input shaft INPUT1 remains directly connected to the engine 1, even though the second transfer gear pair 5 and the main-shift 1-range shift gear pair GM1 are decoupled, so the torque from the engine 1 keeps being transmitted to the output shaft OUTPUT through the first transfer gear pair 3, the first countershaft CNT1, and the sub-shift 1-range shift gear pair GS1, and accordingly, the vehicle can keep running forward in the 1-range.

Thereafter, torque transmitted from the engine 1 through the first input shaft INPUT1 directly connected to the engine 1 keeps being transmitted to the output shaft OUTPUT through the first countershaft CNT1 even if the clutch C is disengaged, so the 1-range can be maintained.

Next, a process of shifting from the 1-range to the 2-range is described with reference to FIGS. FIGS. 3A to 3D.

Figure 3A:
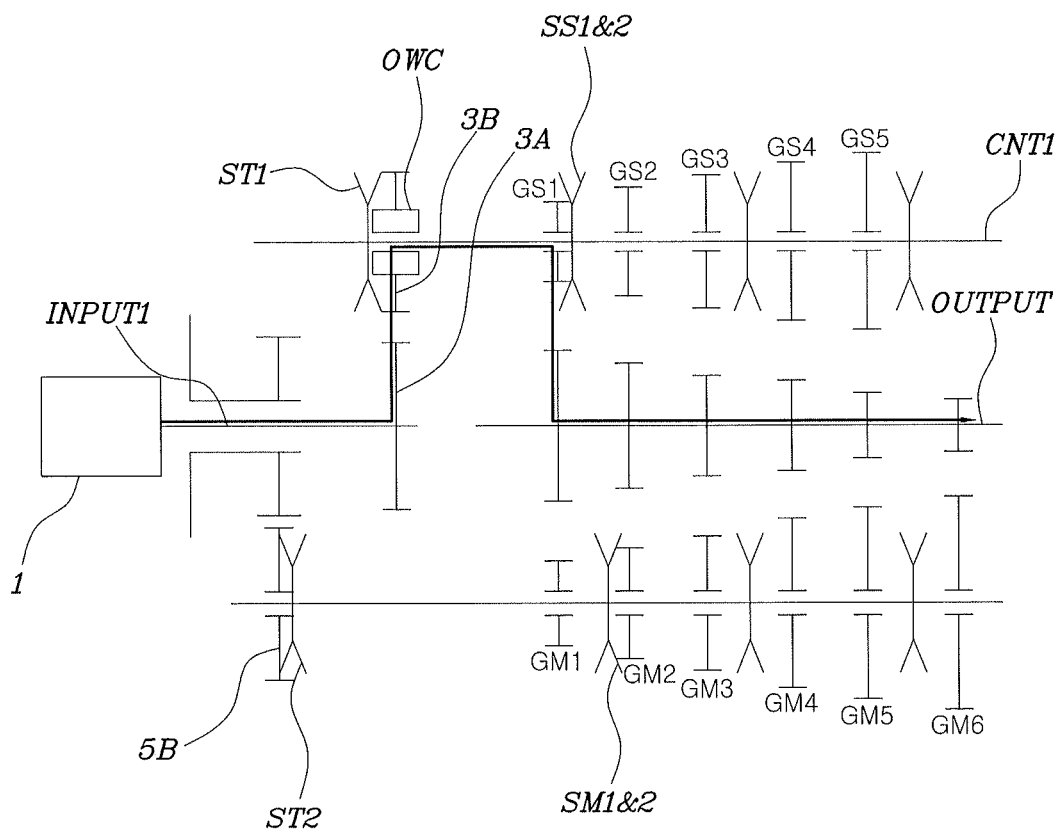
FIGS. 3A to 3D are diagrams illustrating a process of shifting from the 1-range to a 2-range by a transmission for a vehicle of the present invention.

When shifting from the 1-range to the 2-range is started, the second output transfer gear 5B of the second transfer gear pair 5 is coupled to the second countershaft CNT2 by the second transfer coupling device ST2 with the clutch C disengaged, as in FIG. 3A.

Figure 3B:
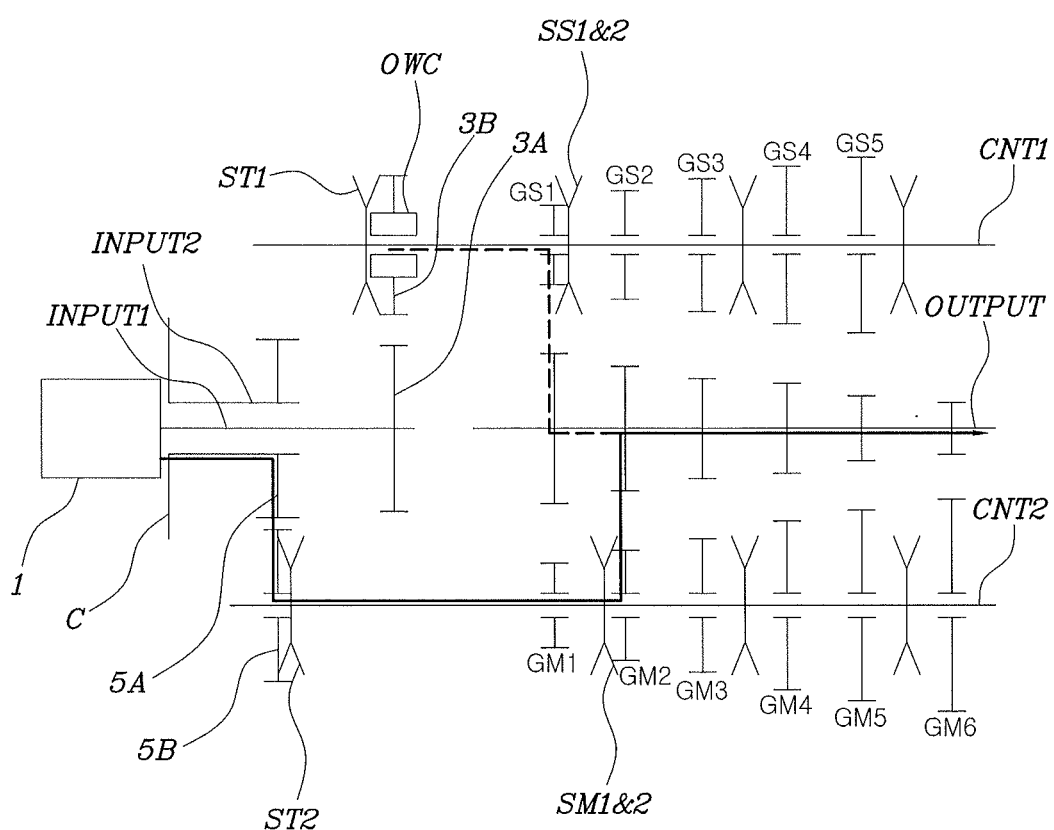

In this state, as the clutch C is slowly engaged, as in FIG. 3B, the torque from the engine 1 starts to be transmitted through the second input shaft INPUT2, so power is transmitted to the second countershaft CNT2 through the second transfer gear pair 5 and the vehicle can run in the 2-range by the main-shift 2-range shift gear pair GM2.

In this case, before the clutch C is engaged, the first transfer gear pair 3 and the sub-shift 1-range shift gear pair GS1 are engaged and the vehicle runs in the 1-range, but after the clutch C is engaged, shifting to the 2-range is made by the second transfer gear pair 5 and the main-shift 2-range shift gear pair GM2.

However, the difference in rotation speed between the first countershaft CNT1 and the first input shaft INPUT1, in which the first countershaft CNT1 rotates at a higher speed than the first input shaft INPUT1, due to the difference in gear ratio between the sub-shift 1-range shift gear pair GS1 and the main-shift 2-range shift gear pair GM2 is allowed and absorbed by the one-way clutch OWC, so the torque from the engine is not transmitted from the first countershaft CNT1 to the first input shaft INPUT1.

Accordingly, in the process of shifting from the 1-range to the 2-range, the flow of power from the first countershaft CNT1 to the output shaft OUTPUT is smoothly changed to the output shaft OUTPUT from the second countershaft CNT2 by slip engagement control of the clutch C and relative rotation allowed by the one-way clutch OWC, so deterioration of shifting ability, including a backward pulling effect of a vehicle when shifting, is prevented.

Figure 3C:
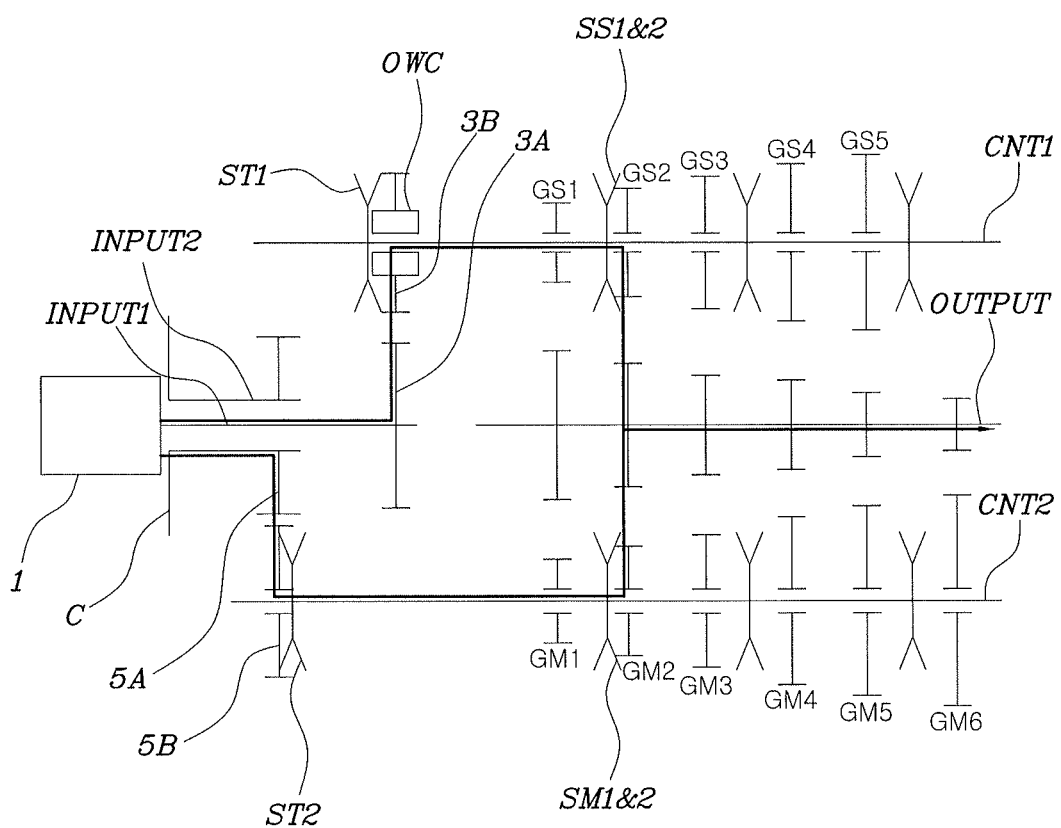

Thereafter, as in FIG. 3C, the first output transfer gear 3B of the first transfer gear pair 3 is coupled to the first countershaft CNT1 by the first transfer coupling device ST1.

That is, when a vehicle runs in the 2-range, as in FIG. 3B, the first input shaft INPUT1 and the second input shaft INPUT2 rotate at the same rotation speed, in which the first transfer gear pair 3 and the second transfer gear pair 5 make the same gear ratio and the main-shift 2-range shift gear pair GM2 and the sub-shift 2-range shift gear pair GS2 also make the same gear ratio.

Accordingly, not only the first transfer gear pair 3 and the second transfer gear pair 5, but the main-shift 2-range shift gear pair GM2 and the sub-shift 2-range shift gear pair GS2 are rotated with their rotation speed synchronized, so the corresponding coupling device or synchronizer can be safely coupled without coupling noise or damage of the first transfer gear pair 3 and the sub-shift 2-range shift gear pair GS2.

Figure 3D:
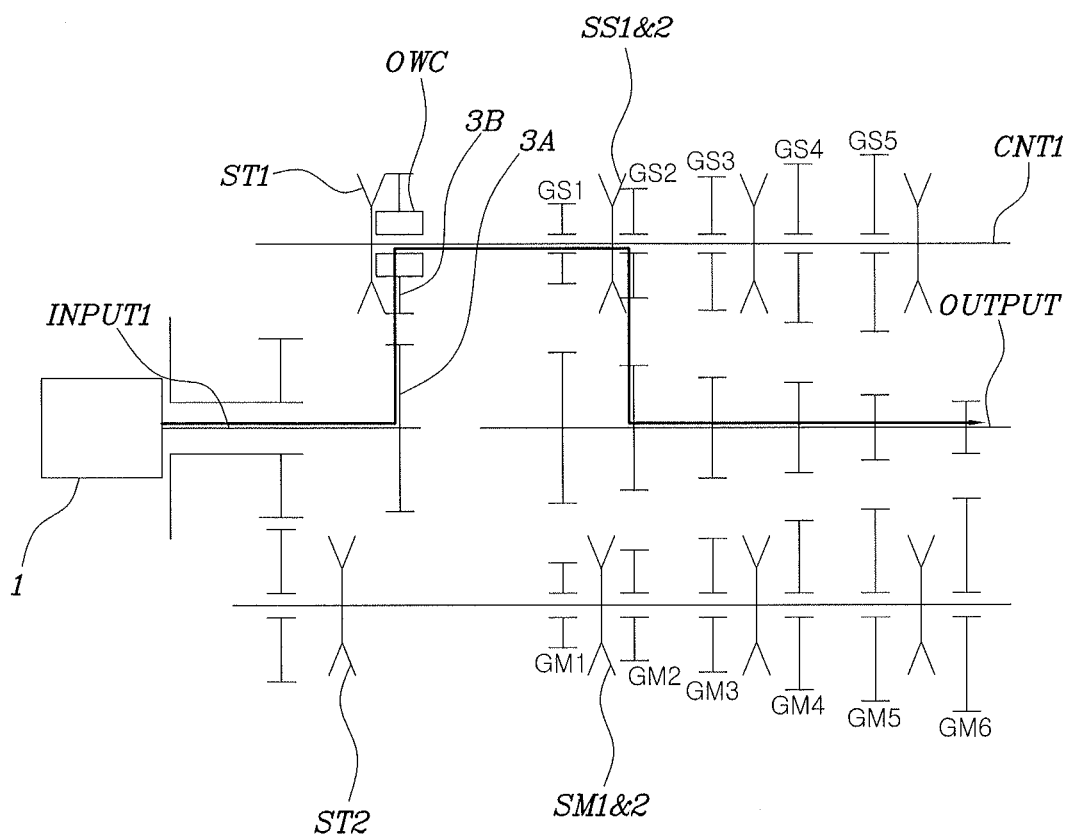

Next, as in FIG. 3D, the second transfer coupling device ST2 is decoupled from the second transfer gear pair 5 and the main-shift 1&2 synchronizer SM1&2 is decoupled from the main-shift 2-range shift gear pair GM2. However, the first input shaft INPUT1 remains directly connected to the engine 1, even though the second transfer gear pair 5 and the main-shift 2-range shift gear pair GM2 are decoupled, so the torque from the engine 1 keeps being transmitted to the output shaft OUTPUT through the first transfer gear pair 3, the first countershaft CNT1, and the sub-shift 2-range shift gear pair GS2, and accordingly, the vehicle can keep running forward in the 2-range.

Thereafter, torque transmitted from the engine 1 through the first input shaft INPUT1 directly connected to the engine 1 keeps being transmitted to the output shaft OUTPUT through the first countershaft CNT1 even if the clutch C is disengaged, so the 2-range can be maintained.

Further, the other ranges can be achieved in the processes of shifting described above.

As described above, according to the present invention, torque from the engine 1 transmitted to the output shaft OUTPUT in a specific range is smoothly changed to the output shaft OUTPUT by slip engagement control of the clutch and relative rotation action allowed by the one-way clutch OWC in a process of shifting to a desired range, so deterioration of shifting ability, including a backward pulling effect of a vehicle when shifting, is prevented.

Although an exemplary embodiment of the present invention has been described for illustrative purposes, those skilled in the art will appreciate that various modifications, additions and substitutions are possible, without departing from the scope and spirit of the invention as disclosed in the accompanying claims.

For convenience in explanation and accurate definition in the appended claims, the terms "upper", "lower", "inner" and "outer" are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A transmission for a vehicle, comprising:
    a first input shaft continuously receiving torque from a power source;
    a second input shaft selectively receiving torque from the power source through a clutch;
    a first countershaft and a second countershaft connected with the first input shaft and the second input shaft, respectively, by a transfer gear pair;
    coupling devices transmitting torque to the first countershaft and the second countershaft from the first input shaft and the second input shaft by selecting the transfer gear pairs;
    a one-way clutch disposed on the first countershaft to allow torque provided to the first input shaft to be transmitted only to the first countershaft from the first input shaft; and
    a shifting mechanism including a plurality of shift gear pairs having different gear ratios on the first countershaft, the second countershaft, and an output shaft, and changing and outputting power from the power source to the output shaft by selecting a shift gear pair corresponding to a speed of the vehicle, using a synchronizer.

2. The transmission of claim 1, wherein the one-way clutch is disposed in a power transmission path from an output transfer gear of the transfer gear pair on the first countershaft.

3. The transmission of claim 1, wherein the one-way clutch is disposed between the first countershaft and one of the coupling devices, wherein the one of the coupling devices selectively couples an output transfer gear of the transfer gear pairs to the first countershaft.

4. The transmission of claim 1, wherein the transfer gear pairs include:
    a first transfer gear pair having a first input transfer gear on the first input shaft and a first output transfer gear on the first countershaft; and
    a second transfer gear pair having a second input transfer gear on the second input shaft and a second output transfer gear on the second countershaft, and
    the coupling devices include:
    a first transfer coupling device selectively coupling the first transfer gear pair; and
    a second transfer coupling device selectively coupling the second transfer gear pair.

5. The transmission of claim 4, wherein the first transfer coupling device is disposed on the first countershaft and engaged with the first output transfer gear, and
    the second transfer coupling device is disposed on the second countershaft and engaged with the second output transfer gear.

6. The transmission of claim 1, wherein the shift gear pairs include:
    a plurality of sub-shift gear pairs having different gear ratios and disposed on the first countershaft and the output shaft; and
    a plurality of main-shift gear pairs having different gear ratios and disposed on the second countershaft and the output shaft,
    wherein the sub-shift gear pairs and the main-shift gear pairs are configured such that shift gear pairs having a same gear ratios exist.

7. The transmission of claim 3, wherein the shift gear pairs include:
    a plurality of sub-shift gear pairs having different gear ratios and disposed on the first countershaft and the output shaft; and
    a plurality of main-shift gear pairs having different gear ratios and disposed on the second countershaft and the output shaft,
    wherein the gear pairs are configured such that a same resultant gear ratio exists between resultant gear ratios of a gear ratio of the first transfer gear pair and gear ratios of the sub-shift gear pairs and resultant gear ratios of a gear ratio of the second transfer gear pair and the main-shift gear pairs.

8. The transmission of claim 6, wherein the shift gear pairs having a same gear ratios have gear ratios over a specific gear ratio.

9. The transmission of claim 6, wherein the sub-shift gear pairs and the main-shift gear pairs share output gears on the output shaft.

\* \* \* \* \*